United States Patent [19]

Staub, Jr.

[11] Patent Number: 4,798,129
[45] Date of Patent: Jan. 17, 1989

[54] CAM AND LOCK VACUUM BOOSTER MOUNT WITH INVERSE ARC SECURING TAB ARM

[75] Inventor: Vincent M. Staub, Jr., Dayton, Ohio

[73] Assignee: General Motors Corporation, Detroit, Mich.

[21] Appl. No.: 1,697

[22] Filed: Jan. 9, 1987

[51] Int. Cl.⁴ .................. F01B 11/02; F01B 29/00; B25G 3/16
[52] U.S. Cl. .................................. 92/128; 92/161; 92/169; 403/326; 403/349; 248/222.1; 24/590
[58] Field of Search ............... 92/98 D, 128, 146, 161, 92/169.2, 169.1; 24/590–593, 671–674, 371; 403/194, 199, 201, 300, 301, 326, 348, 349, 19, 78, 350; 248/222.1, 222.3

[56] References Cited

U.S. PATENT DOCUMENTS

| 757,712 | 4/1904 | Arnold | 403/348 X |
|---|---|---|---|
| 2,099,116 | 11/1937 | Kalmbach | 248/222.3 X |
| 2,977,935 | 4/1961 | Randol | 91/369 B |
| 4,455,829 | 6/1984 | Seip | 92/128 X |
| 4,527,762 | 7/1985 | Duell | 248/222.1 |
| 4,538,967 | 9/1985 | Furukawa | 403/349 X |

Primary Examiner—Robert E. Garrett
Assistant Examiner—George Kapsalas
Attorney, Agent, or Firm—D. D. McGraw

[57] ABSTRACT

A booster mounted on a supporting panel by a cam and lock arrangement has an inverse arc securing tab and arm mechanism which prevents further rotation in either direction from the installed position.

2 Claims, 1 Drawing Sheet

CAM AND LOCK VACUUM BOOSTER MOUNT WITH INVERSE ARC SECURING TAB ARM

BACKGROUND OF THE INVENTION

The invention relates to a mounting arrangement for mounting a power head such as that of a brake booster to a fixed panel, the mounting being arranged on one side of the panel for simplified assembly. It more particularly relates to a securing arrangement for rotated mounting of a brake booster to the dash of a vehicle. It is an improvement over portions of the booster mount disclosed and claimed in co-pending U.S. application Ser. No. 776,698, entitled "Booster Mount", filed Sept. 16, 1985 and assigned to the common assignee. The booster may be of a conventional type, which is normally mounted to the vehicle dash panel with the booster in the engine compartment of the vehicle and the booster push rod extending rearwardly into the passenger compartment and attached to a brake pedal arm for actuation by the vehicle operator. It has been common practice for many years to secure a brake booster housing to the firewall of a vehicle by means of studs extending through holes in the firewall. In some instances a mounting bracket may be secured to the firewall and the booster is in turn secured to the mounting bracket. Examples of such constructions are replete in the art. For example, U.S. Pat. No. 3,013,537, issued Dec. 19, 1961, shows a booster 13 with bolts 43 extending through a firewall so as to mount the booster on the firewall. A bracket mounting arrangement using studs is illustrated in U.S. Pat. No. 2,949,892, issued Aug. 23, 1960. It has also been known to secure a bracket to the booster and have the bracket extend into the passenger compartment with the mounting bracket being bolted to the firewall. Examples of this are found in U.S. Pat. Nos. 3,698,260, issued Oct. 17, 1972; and 3,714,780, issued Feb. 6, 1973.

The booster mount of the co-pending application noted above includes a housing plate on the power head which is meshed with and turned to cam lock into another plate which is secured to the vehicle dash. Once the booster power head has been interlocked in spring-loaded camming relation, a fastener or fasteners may be secured to an arm formed as a part of the housing plate to keep the booster power head from rotating in the reverse direction to become unlocked. All of the motions of installing the power head are circular about the axis of the power head and push rod, the camming action producing a slight axial movement as the power head is cam locked in place. The arm of that application extends well beyond the housing plate and the power head and is readily subject to being damaged during handling before it is secured in place.

SUMMARY OF THE INVENTION

The improvement herein disclosed and claimed permits a much shorter arm to be provided as a part of the housing plate or cam bracket so that it terminates near the power head housing and radially inwardly of that housing's maximum radius while permitting easy access for securing the arm in a desired arcuate position.

DETAILED DESCRIPTION OF THE PREFERRED EMBODIMENT

Figure 1:
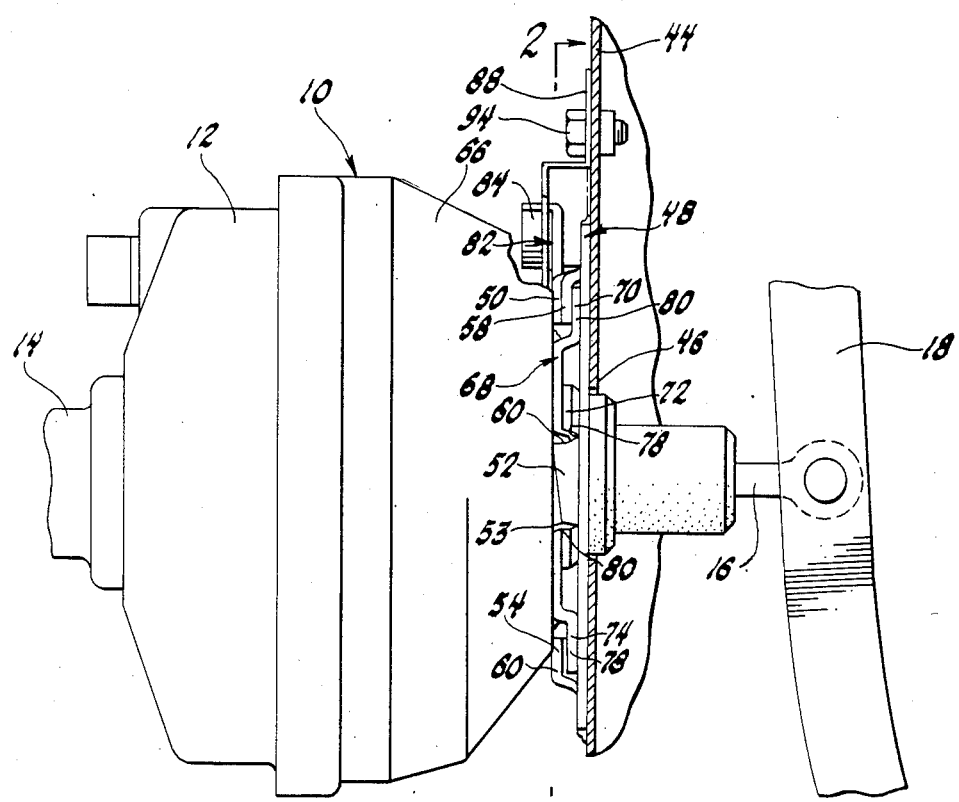
FIG. 1 is an elevation view with parts broken away and in section and illustrating a brake booster power head secured to a vehicle dash or firewall panel by an arrangement embodying the invention. The veiw shown in FIG. 1 is taken in the direction of arrow 1—1 of FIG. 2.

The power head 10 shown in the drawing is illustrated as being a brake booster assembly including a booster housing 12 and a master cylinder assembly 14 actuated by the booster, as is well known in the art. The booster assembly 10 includes a push rod 16 extending rearwardly and connected to the brake pedal arm 18 of the vehicle for actuation.

The vehicle in which the assembly 10 is installed has a fixed panel 44 which is sometimes identified as a firewall or dash. The portion of the panel which is directly related to the mounting arrangement for the booster is preferably a planar panel section as illustrated in FIG. 1. It has an opening 46 formed therein through which the rearward portion of the booster assembly 10, particularly including push rod 16, axially extends. An annular cam plate 48 is secured to the side of the panel 44 facing the engine compartment of the vehicle. It is secured about the panel opening 46. The cam plate has a series of circumferentially spaced cam plate tabs 50, 52, 54 and 56 extending radially inwardly therefrom and in axially spaced relation to the planar panel section of fixed panel 44. While four such cam plate tabs are shown, it is recognized that three or more cam plate tabs will function quite well. Each of the cam plate tabs has an arcuately oriented trailing edge 58 and an arcuately oriented leading edge 60. A leading edge is the first of the two tab edges of one tab which by relative movement arcuately approaches or is arcuately approached by another tab during relative movements between the two tabs which secure the booster assembly 10 to panel 44. The leading edge 60 of each cam plate tab is spaced axially further away from the planar panel section of panel 44 than is the trailing edge 58 of each of the cam plate tabs. Therefore each of the cam plate tabs is positioned in a plane which is at an angle to the plane of the planar panel section of panel 44. Panel 44 is also provided with another opening 62 which is spaced radially outwardly of the annular cam plate 48. This opening provides a securing and locating mount opening as will be further described.

Figure 3:
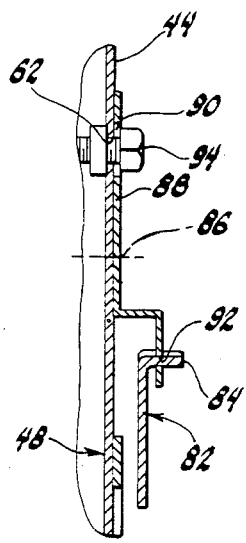
FIG. 3 is a fragmentary cross-section view taken in the direction of arrows 3—3 of FIG. 2.

The power head housing 12 includes a housing section 66 which extends axially and radially, with the push rod 16 extending outwardly therefrom. An annular cam bracket 68 is secured to the power head housing section 66 about the push rod 16. Cam bracket 68 has circumferentially spaced bracket tabs 70, 72, 74 and 76 which extend radially outwardly and are in axially spaced relation to the power head housing section 66. Each of the bracket tabs has an arcuately oriented trailing edge 78 and an arcuately oriented leading edge 80. It is to be understood that three or more bracket tabs may be formed from the annular cam bracket 68, so long as they are circumferentially spaced in cooperative relation with the cam plate tabs of the annular cam plate 48. The bracket tabs 70, 72, 74 and 76 are circumferentially spaced in cam-engageable relation with the cam plate tabs 50, 52, 54 and 56. When so engaged they cooperate with the cam plate tabs to secure the power head 10 to the panel 44. All of the tabs of the cam plate and the bracket are spring-like in action to maintain tight axial loading when engaged in securing relation. The leading edges 60 of the cam plate tabs 50, 52, 54 and 56 engage the bracket tabs 70, 72, 74 and 76 as the power head is placed in position and rotated about the axis of the power head and push rod. This engagement is in cammed spring-loaded relation so that the power head is mounted firmly to the panel 44. In accordance with the definition of a leading edge set forth above, each edge 60 of each cam plate tab is first approached by each edge 80 of each cam bracket tab as the cam bracket 68 is rotated clockwise as seen in FIG. 3 to the secured position shown in that Figure. The power head may be arcuately rotatable in the opposite direction to disengage the bracket tabs from the cam plate tabs to remove the power head from the panel. In some instances, it is desirable to have the bracket tabs 70, 72, 74 and 76 so arranged that their leading edges 80 are spaced axially from the panel 44 for a distance which is different from that of the trailing edges of those tabs so that the bracket tabs are each positioned in a plane which is at an angle to the plane of the panel 44. Therefore in some instances bracket tabs 70, 72, 74 and 76 are the angled cam tabs and in other instances the cam plate tabs 50, 52, 54 and 56 are the angled tabs. In other instances it may be desirable to provide both sets of tabs at angles so as to increase camming and spring-like securing action.

The annular cam bracket 68 has an arm 82 extending outwardly therefrom and provided with an arcuate flange 84 in its outer end which extends away from panel 44. The radius of the arcuate flange extends away from the annular body of cam bracket 68, with the center 86 from which the radius extends therefore being outside of bracket 68 and cam plate 48. A bolt and nut assembly 94 extends through openings 62 and 90 and mounts tab 88 on panel 44. A securing tab 88 has an elongated closed slot-like opening 90 at one end. Opening 90 may be round but is preferably slot-like and elongated lengthwise of tab 88. Another slot 92 is formed in the other end of tab 88. Slot 92 is arcuate with the same radius as the arcuate flange 84 so that flange 84 may be received therein. The axis of arcuate slot 92 is located between that slot and opening 90. When tab 88 is installed as shown, the axis of slot 92 is coincident with the center 86 of arcuate flange 84.

Figure 2:
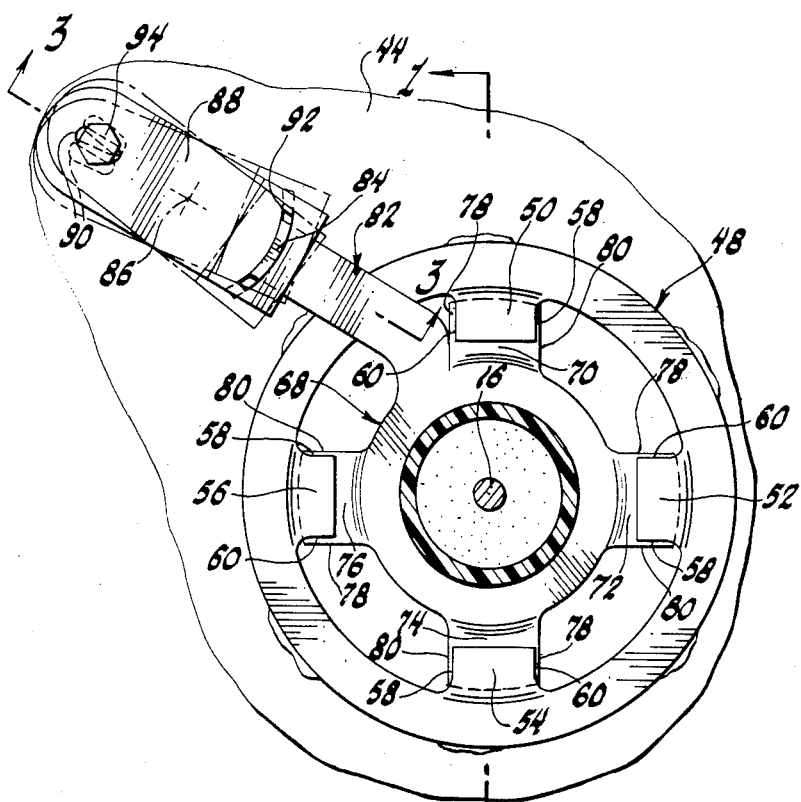
FIG. 2 is a fragmentary cross-section view taken in the direction of arrows 2—2 of FIG. 1 and showing the mounting and securing arrangement embodying the invention.

In order to mount the booster assembly 10 to the panel 44, it is merely necessary to axially align the push rod 16 with the panel opening 46 and to align the bracket tabs 70, 72, 74 and 76 with spaces between the cam plate tabs 50, 52, 54 and 56. As seen in FIG. 2, this sould place the bracket arm 82 at an upwardly and leftwardly extending angle. The entire booster assembly is then arcuately rotated clockwise as seen in FIG. 2 so that the tabs 50, 52, 54 and 56 and the tabs 70, 72, 74 and 76 operate in camming spring loaded relation to tightly secure the power head 10 to the panel 44. In doing so the two sets of tabs are positioned as best shown in FIG. 2. Bracket arm 82 extends toward the opening 62 of panel 44. Tab 88 is placed in position so that arcuate flange 84 is received in arcuate slot 92. The tab 88 is then rotated about axis and center 86 so that opening 90 is aligned with openings 62. the bolt and nut assembly 94 is then tightened to hold the tab 88 in position. The inverse arc or slot 92 and flange 84 in relation to the axis of rotation of cam bracket 68 and booster 10 prevents any arcuate movement of the cam bracket 68 and booster 18 in either direction.

I claim:

1. In an arrangement for rotatably mounting and dismounting a brake booster about the brake booster axis to and from a fixed panel, mechanism selectively securing the brake booster in its mounted position against rotation about its axis relative to the fixed panel, said mechanism comprising:

a bracket secured to the brake booster and providing a part of the brake booster mounting and dismounting arrangement, said bracket having an annular main body provided with rotatable camming means thereon which are adapted to cooperate with mating camming means on the fixed panel to mount the brake booster, said bracket further having an arm extending therefrom so as to have its outer end positioned radially outward of said bracket annular main body but terminating short of the maximum radius of the brake booster so as to be at least partially protected thereby during handling;

said bracket arm outer end being formed with a reverse arc flange bent from said arm so as to extend toward the brake booster, the center of the arc radius of said flange being positioned outwardly of said arm to provide the reverse arc;

and a plate-like tab having an arcuate slot formed in one end complementary with said reverse arc flange and receiving said flange therethrough, said tab slot having the center of its arc radius located at an intermediate part of said plate-like tab and, when said flange is extending therethrough, being coincident with the center of the arc radius of said flange, said plate-like tab further having an opening formed in its other end;

and means extending through said tab other end opening, said means securing said tab to the fixed panel against movements relative thereto, the reverse arcs of said tab slot and said bracket arm flange preventing rotational movement of said bracket and the brake booster in either arcuate direction relative to the fixed panel about the rotational mounting and dismounting axis of the brake booster.

2. An arrangement for selectively locking a first member against rotation relative to a second member on which said first member is mounted and dismounted by rotation relative thereto about a first axis, said arrangement comprising:

said first member having an arm extending therefrom in a plane substantially perpendicular to said first axis, said arm having an outer end formed by a flange extending generally parallel to said first axis, said flange being arcuate with the center of its arc radius being on a second axis substantially parallel to said first axis and located in the direction of extension of said arm away from said first axis so that the arc of said flange is reverse to the arcuate movement of said arm as said first member is rotated relative to said second member;

and a locking tab having an opening at one tab end selectively receiving means selectively securing said locking tab to said second member against movements relative to said second member, an arcuately extending slot at the other tab end having the same radius of curvature as said arcuate flange and receiving said arcuate flange therethrough so that the arc of said tab slot is also reverse to the arcuate movement of said arm as said first member is rotated relative to said second member about said first axis;

the reverse arcs of said flange and said tab slot cooperating when said tab is secured to said second member by said securing means to prevent rotational movement of said first member relative to said second member in either rotational direction about said first axis.

* * * * *